United States Patent
Kissinger et al.

(10) Patent No.: US 12,515,256 B2
(45) Date of Patent: Jan. 6, 2026

(54) LIGHT VALVE COOLING SYSTEM

(71) Applicant: Seurat Technologies, Inc., Wilmington, MA (US)

(72) Inventors: Drew W. Kissinger, Carlisle, MA (US); Susanne Kras, Chelmsford, MA (US); James A. DeMuth, Woburn, MA (US); Andrew J. Bayramian, Marblehead, MA (US); Francis L. Leard, Sudbury, MA (US); Cote LeBlanc, Malden, MA (US)

(73) Assignee: Seurat Technologies, Inc., Wilmington, MA (US)

( * ) Notice: Subject to any disclaimer, the term of this patent is extended or adjusted under 35 U.S.C. 154(b) by 0 days.

(21) Appl. No.: 18/624,762

(22) Filed: Apr. 2, 2024

(65) Prior Publication Data

US 2024/0246152 A1     Jul. 25, 2024

Related U.S. Application Data

(63) Continuation of application No. 17/512,966, filed on Oct. 28, 2021, now Pat. No. 11,969,790.

(60) Provisional application No. 63/107,308, filed on Oct. 29, 2020.

(51) Int. Cl.
| | |
|---|---|
| *B22F 12/20* | (2021.01) |
| *B22F 12/40* | (2021.01) |
| *B29C 64/268* | (2017.01) |
| *B29K 105/00* | (2006.01) |
| *B33Y 10/00* | (2015.01) |
| *B33Y 30/00* | (2015.01) |

(Continued)

(52) U.S. Cl.
CPC .............. *B22F 12/20* (2021.01); *B22F 12/40* (2021.01); *B29C 64/268* (2017.08); *B33Y 10/00* (2014.12); *B33Y 30/00* (2014.12); *B33Y 70/00* (2014.12); *G02B 7/028* (2013.01); *B29K 2105/251* (2013.01)

(58) Field of Classification Search
CPC ........ B22F 12/20; B22F 12/40; B29C 64/268; B29K 2105/251; B33Y 30/00; B33Y 40/00; B33Y 70/00; G02B 7/028; G02B 7/08; Y02P 10/25
See application file for complete search history.

(56) References Cited

U.S. PATENT DOCUMENTS

| | | | |
|---|---|---|---|
| 6,354,370 B1 * | 3/2002 | Miller | H01L 23/427 62/223 |
| 10,018,802 B1 * | 7/2018 | Dergham | G02B 7/1815 |
| 2017/0219855 A1 * | 8/2017 | DeMuth | G02F 1/0126 |

(Continued)

FOREIGN PATENT DOCUMENTS

| | | |
|---|---|---|
| JP | 1998056226 | 2/1998 |
| JP | 2018535320 | 11/2018 |
| WO | 2019133422 | 7/2019 |

*Primary Examiner* — Philip C Tucker
*Assistant Examiner* — Jimmy R Smith, Jr.
(74) *Attorney, Agent, or Firm* — David R. Stevens; Stevens Law Group

(57) ABSTRACT

An additive manufacturing system includes a high power laser to form a laser beam directed against a light valve. An active light valve cooling system is arranged to remove heat from the light valve and a heat exchanger is connected to the active light valve cooling system. A heat exchange fluid is circulated through the active light valve cooling system and the heat exchanger.

10 Claims, 8 Drawing Sheets

(51) Int. Cl.
  *B33Y 70/00*    (2020.01)
  *G02B 7/02*    (2021.01)

(56) References Cited

U.S. PATENT DOCUMENTS

2017/0232637 A1   8/2017  DeMuth
2020/0094478 A1*  3/2020  Zediker ............... B23K 26/703

* cited by examiner

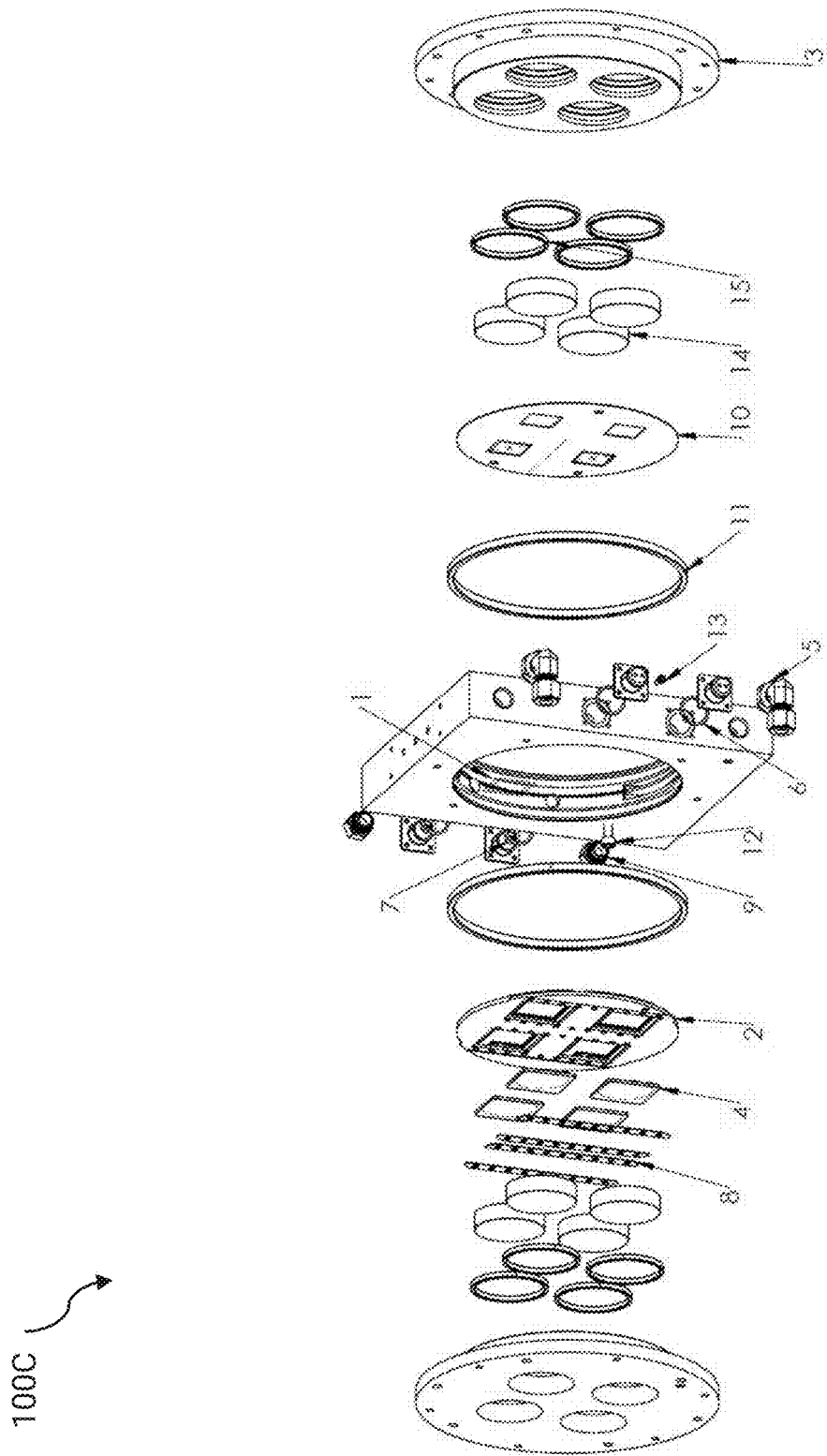

LIGHT VALVE COOLING SYSTEM

RELATED APPLICATION

This application is a continuation of U.S. patent application Ser. No. 17/512,966, filed Oct. 28, 2021, which claims the priority benefit of U.S. Provisional Patent Application No. 63/107,308, filed Oct. 29, 2020, both of which are hereby incorporated by reference in their entirety.

TECHNICAL FIELD

The present disclosure generally relates to operation high fluence light valve systems. More particularly, techniques, components, and materials to allow active and passive cooling of light valves subjected to high optical fluence.

BACKGROUND

High power laser systems with light valves can require removal of excess or unwanted energy. This is particularly true in the field of metal additive manufacturing (AM). which may benefit from stable long-term operation of a laser source even though a laser is intermittently applied to a target powder chamber. Interrupting the operation of the laser system can cause machine safety concerns and reduce shot to shot energy stability.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 1C illustrates a cooling housing for a 2×2 light valve array;

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the following disclosure, improvements to an additive manufacturing system having multiple components are described. Such a system can include a high power laser to form a laser beam directed against a light valve. An active light valve cooling system is arranged to remove heat from the light valve and a heat exchanger is connected to the active light valve cooling system. A heat exchange fluid is circulated through the active light valve cooling system and the heat exchanger.

In some embodiments, the heat exchanger acts to provide useful energy to at least one component of the additive manufacturing system.

In some embodiments, the heat exchanger can power a heat engine suitable for generating mechanical, thermoelectric, or electric power.

In some embodiments, the heat exchanger can be used to increase temperature of at least one of the multiple components.

In some embodiments, the heat exchange fluid comprises a phase change material

In some embodiments, the heat exchange fluid is sprayed onto the light valve.

In some embodiments, the active light valve system cools an array of light valves.

Figure 1A:
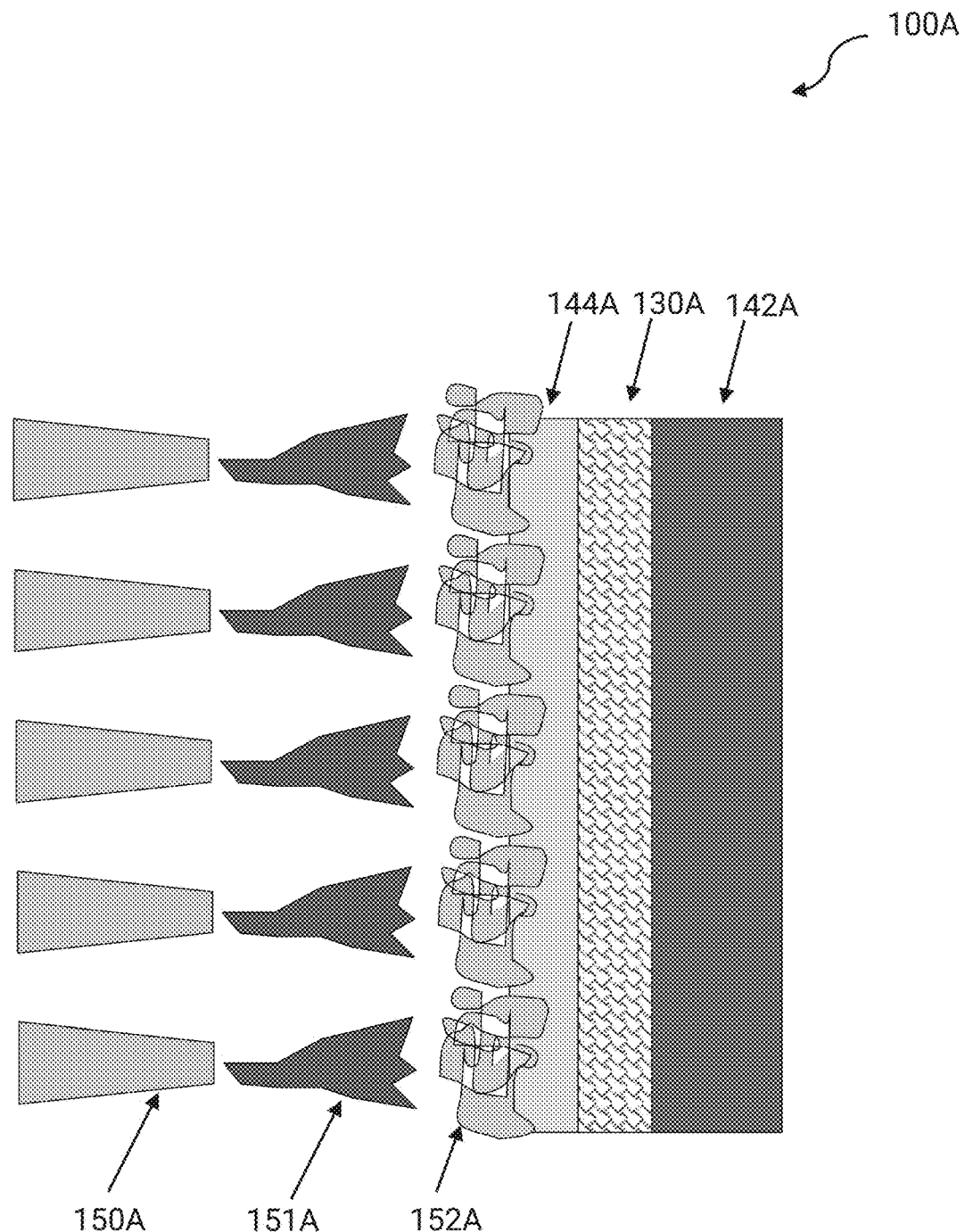
FIG. 1A illustrates use of phase change cooling within a light valve structure.

FIG. 1A illustrates a cooling system 100A that uses of phase change cooling within a light valve structure. This method of cooling can be used in either a transmissive or reflective light valve structure, the reflective light valve depicted here is to aid clarity of its teaching. An array of cooling nozzles 150A transport and control the speed and volume of the phase change fluid 151A as the liquid sprays onto the hot side of a reflective light valve composed of a hot layer supporting substrate 144A, a reflecting light modifying structure 130A, and a secondary supporting structure 142A. The cooling liquid 151A undergoes a phase change from liquid to vapor 152A through the action of expansion from the nozzles 150A and the temperature of the hot supporting structure 144A. The phase transition (heat of fusion) of a liquid greatly enhances its capacity to absorb heat. The speed at which the fluid/gas flows across and interacts with the hot substrate also enhances the fluid/gas capacity to absorb heat. Increasing the turbulence of the gas phase 152A at the hot substrate 144A interface additionally increases the ability to absorb heat and allows the system to work in high fluence light. The selection of cooling fluid 151A, the design and construction of the nozzles 150A, and amount of designed turbulence of the liquid to gas phase transition 152A all greatly enhances the ability of any light valve to handle absorption generated in a high fluence system.

Figure 1B:
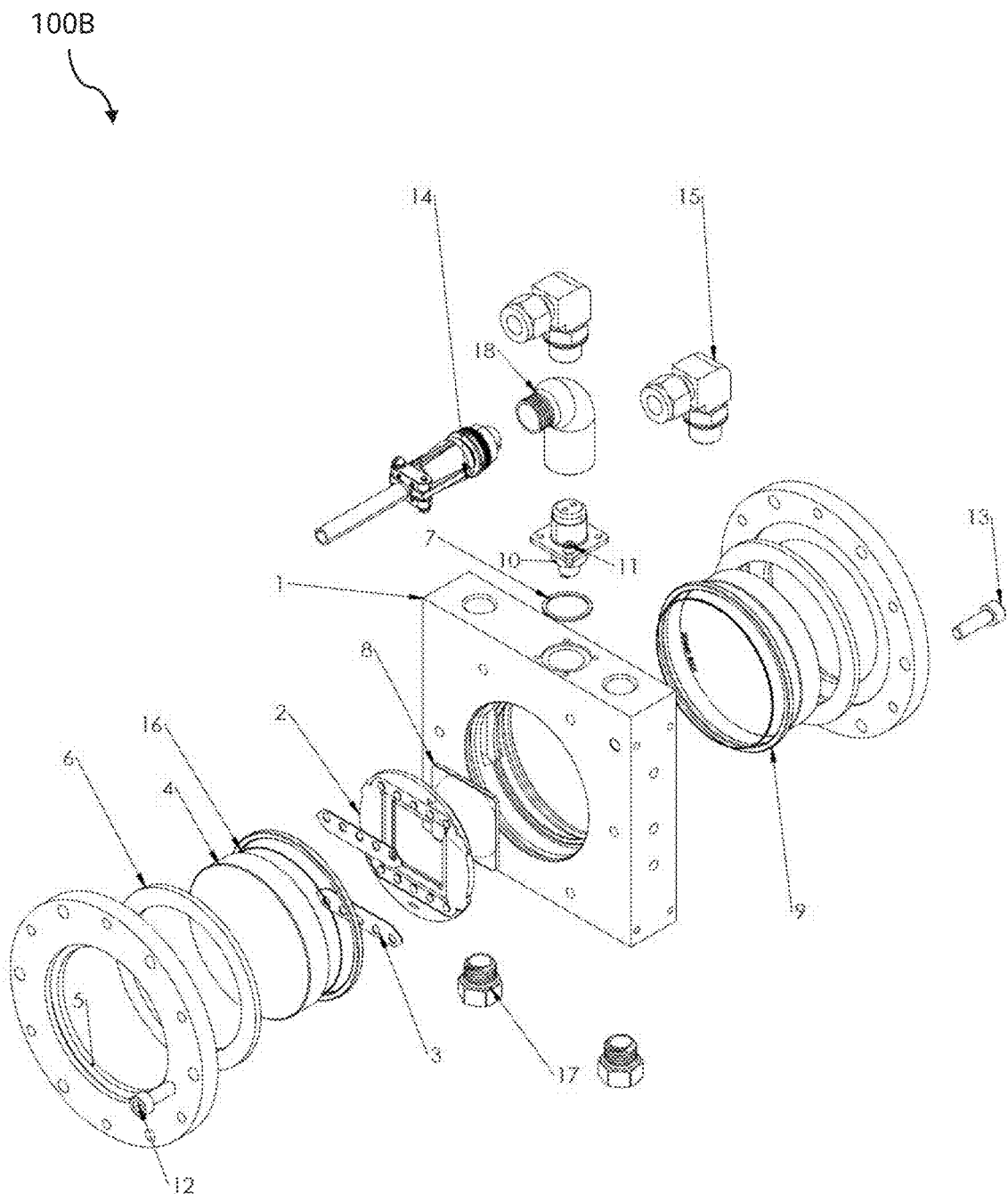
FIG. 1B illustrates a cooling housing for a single light valve (LV)

FIG. 1B illustrates a cooling system 100B with a cooling housing for a single light valve (LV). A cooling housing body 1 for a single LV and in which all the other components are located is illustrated. An LV fixture 2 holds an LV device 8. The cooling housing 1 contains window clamping structure (5 and 6) with the window assembly components (3, 4, 9, and 16). Clamping force is applied via an array of bolts (12 and 13) that are applied the outside flanges and tightened against cooling housing 1. The cooling fluid flows through cooling housing 1 using fluid connectors 14, 15, 17, and 18. Electrical interfaces to cooling housing 1 are provided as electrical component 10. Gasketing components and seals 3, 5, 6, 7, 9 and 16 are used to prevent the cooling fluid from leaking from various interfaces.

FIG. 1C illustrates cooling system 100C with a cooling housing for a 2×2 light valve array. A cooling housing body 1 includes an array of LVs (a 2×2 array in this example) and in which all the other components are located. Fixture 2 holds LV devices 4 in conjunction with LV gasketing 8. The cooling housing 1 contains window clamping structure (3 in combination with the window assemblies consisting of items 10, 11, 14, and 15). Clamping force is applied via an array of bolts (12) that are applied to outside flanges and tightened against cooling housing 1. The cooling fluid flows through cooling housing 1 with fluid connectors 5 and 9. Electrical interfaces to cooling housing 1 are provided as electrical component 7. Gaskets and seals 6 are used to prevent cooling fluid from leaking from various interfaces. Fixation elements 12 and 13 are used to seat and seal various attached components to cooling housing 1 to allow proper functioning of the cooling assembly.

Figure 1D:
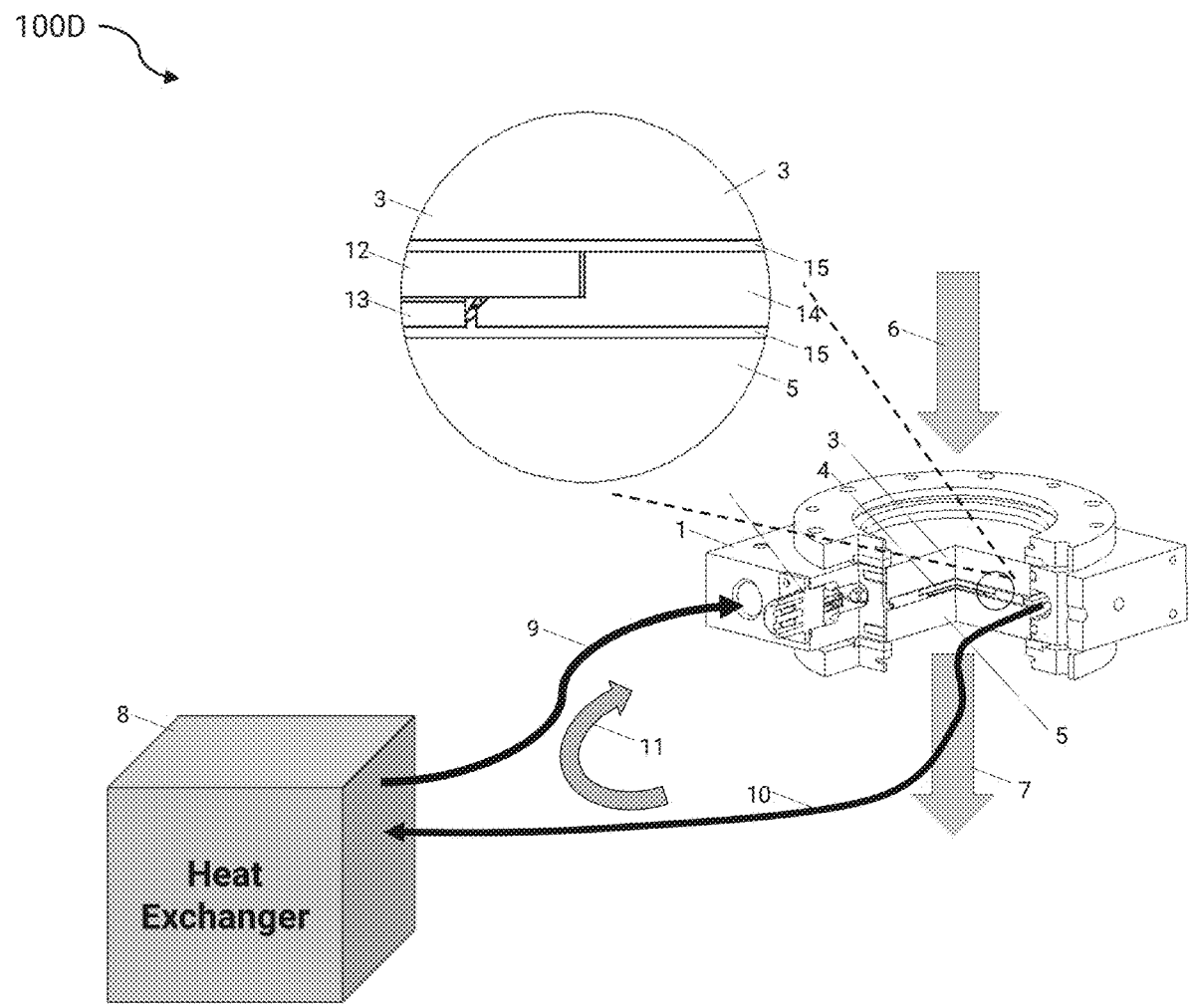
FIG. 1D illustrates details of the cooling system for a light valve housing and applies equally for cooling of singular or arrays of LVs.

FIG. 1D illustrates details of the cooling system 100D for a light valve housing and applies equally for cooling of singular or arrays of LVs. The LV housing 1 contains an assembled LV system (single or an array). An electrical control interface 2 carries electrical activation and control signals into the LV housing 1 and to the LV 4. Laser light (arrow 6) passes through a front window 3, and through the LV 4 where it is patterned. It then passes through a back window 5 and out (arrow 7) of the LV housing 1. The temperature of the LV 4 is controlled by passing a liquid coolant over it in the LV housing 1. Note that the LV temperature may be controlled to be warmer or cooler than the ambient temperature, but here the heat transfer fluid is referred to as a "coolant". The temperature and flow rate of the coolant is controlled by passing it through a heat exchanger 8. The coolant is circulated by a pump inside the heat exchanger 8 to the LV housing 1, and back again. A cooling loop 11 consists of inlet 9 and outlet 10 with fittings and hoses. A detail view shows a LV base component 12 and a LV active component 13 aligned and held in place by a carrier 14 and a compression gasket (not shown). The carrier 14 and compression gasket hold the LV 4 between the front window 3 and the back window 5 in such a way as to form a channel 15 where coolant may flow across the two outside faces of LV components 12 and 13. The height of the flow channel is accurately controlled by the features in the LV housing 1. This allows precise control over LV 4 performance characteristics such as temperature and laser light transmission. Note that the flow channel height may be the same or different on either side of the LV 4.

A wide range of lasers of various wavelengths can used in combination with the described actively cooled light valve system. In some embodiments, possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/MnCl$_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:YVO$_4$) laser, Neodymium doped yttrium calcium oxoborateNd:YCa$_4$O (BO$_3$)$^3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:2O$_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass (147Pm$^{+3}$:Glass) solid-state laser, Chromium doped chrysoberyl (alexandrite) laser, Erbium doped anderbium-ytterbium co-doped glass lasers, Trivalent uranium doped calcium fluoride (U:CaF$_2$) solid-state laser, Divalent samarium doped calcium fluoride(Sm:CaF$_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

Figure 2:
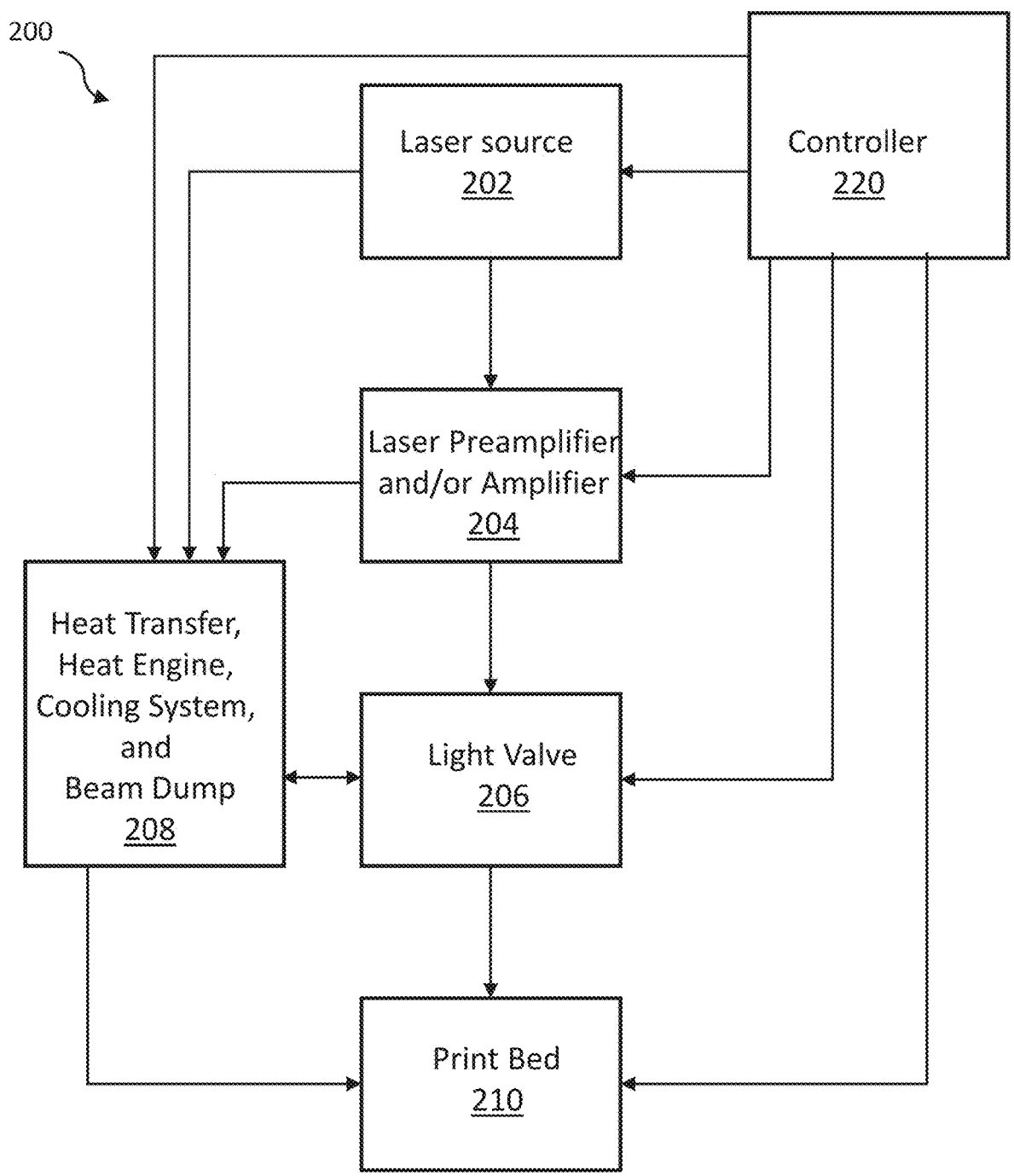
FIG. 2 illustrates a block diagram of a high fluence light valve based additive manufacturing system supporting a beam dump, active light valve cooling system, and heat engine.

FIG. 2 illustrates use of a beam dump in a light valve based additive manufacturing system 200. A laser source 202 directs a laser beam through a laser preamplifier and/or amplifier 204 into a light valve 206. After patterning, light can be directed into a print bed 210. In some embodiments, heat or laser energy from laser source 202, laser preamplifier and/or amplifier 204, or an actively cooled light valve 206 can be actively or passively transferred to a heat transfer, heat engine, cooling system, and beam dump 208. Overall operation of the light valve based additive manufacturing system 200 can controlled by one or more controllers 220 that can modify laser power and timing.

In some embodiments, various preamplifiers or amplifiers 204 are optionally used to provide high gain to the laser signal, while optical modulators and isolators can be distributed throughout the system to reduce or avoid optical damage, improve signal contrast, and prevent damage to lower energy portions of the system 200. Optical modulators and isolators can include, but are not limited to Pockels cells, Faraday rotators, Faraday isolators, acousto-optic reflectors, or volume Bragg gratings. Pre-amplifier or amplifiers 204 could be diode pumped or flash lamp pumped amplifiers and configured in single and/or multi-pass or cavity type architectures. As will be appreciated, the term pre-amplifier here is used to designate amplifiers which are not limited thermally (i.e. they are smaller) versus laser amplifiers (larger) Amplifiers will typically be positioned to be the final units in a laser system 200 and will be the first modules susceptible to thermal damage, including but not limited to thermal fracture or excessive thermal lensing.

Laser pre-amplifiers can include single pass pre-amplifiers usable in systems not overly concerned with energy efficiency. For more energy efficient systems, multi-pass pre-amplifiers can be configured to extract much of the energy from each pre-amplifier 204 before going to the next stage. The number of pre-amplifiers 204 needed for a particular system is defined by system requirements and the stored energy/gain available in each amplifier module. Multi-pass pre-amplification can be accomplished through angular multiplexing or polarization switching (e.g. using waveplates or Faraday rotators).

Alternatively, pre-amplifiers can include cavity structures with a regenerative amplifier type configuration. While such cavity structures can limit the maximum pulse length due to typical mechanical considerations (length of cavity), in some embodiments "white cell" cavities can be used. A "white cell" is a multi-pass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and minors tilted such that the reflections create a ring pattern on the mirror after many passes. By adjusting the injection and mirror angles the number of passes can be changed.

Amplifiers are also used to provide enough stored energy to meet system energy requirements, while supporting sufficient thermal management to enable operation at system required repetition rate whether they are diode or flashlamp pumped. Both thermal energy and laser energy generated during operation can be directed the heat transfer, heat engine, cooling system, and beam dump 208.

Amplifiers can be configured in single and/or multi-pass or cavity type architectures Amplifiers can include single pass amplifiers usable in systems not overly concerned with energy efficiency. For more energy efficient systems, multi-pass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators). Alternatively, amplifiers can include cavity structures with a regenerative amplifier type configuration. As discussed with respect to pre-amplifiers, amplifiers can be used for power amplification.

In some embodiments, thermal energy and laser energy generated during operation of system 200 can be directed into the heat transfer, heat engine, cooling system, and beam dump 208. Alternatively, or in addition, in some embodiments the beam dump 208 can be a part of a heat transfer system to provide useful heat to other industrial processes. In still other embodiments, the heat can be used to power a heat engine suitable for generating mechanical, thermoelectric, or electric power. In some embodiments, waste heat can be used to increase temperature of connected components. As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

Figure 3:
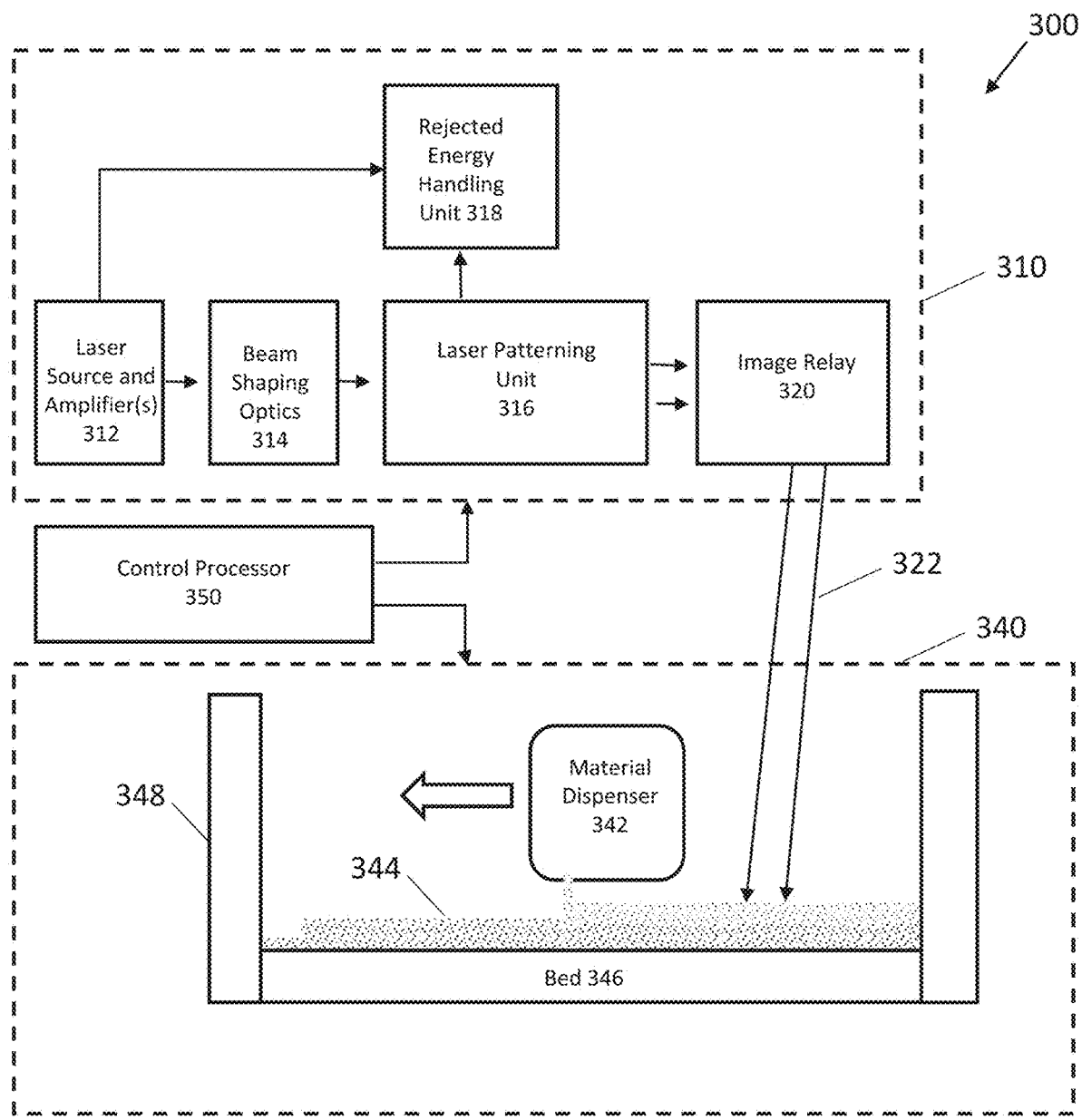
FIG. 3 illustrates a high fluence actively cooled light valve based additive manufacturing system.

FIG. 3 illustrates use of a light valve based additive manufacturing system 300 that can accommodate beam dumps as described in this disclosure. As seen in FIG. 3, a laser source and amplifier(s) 312 can include actively cooled light valves and laser amplifiers and other components such as previously described. As illustrated in FIG. 3, the additive manufacturing system 300 uses lasers able to provide one or two dimensional directed energy as part of a laser patterning system 310. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The laser patterning system 310 uses laser source and amplifier(s) 312 to direct one or more continuous or intermittent energy beam(s) toward beam shaping optics 314. After shaping, if necessary, the beam is patterned by a laser patterning unit 316 that includes either a transmissive or reflective light valve, with generally some energy being directed to a rejected energy handling unit 318. The rejected energy handling unit can utilize heat provided by active of cooling of light valves such as discussed with respect to FIGS. 1A-1D.

Patterned energy is relayed by image relay 320 toward an article processing unit 340, in one embodiment as a two-dimensional image 322 focused near a bed 346. The bed 346 (with optional walls 348) can form a chamber containing material 344 (e.g. a metal powder) dispensed by material dispenser 342. Patterned energy, directed by the image relay 320, can melt, fuse, sinter, amalgamate, change crystal structure, influence stress patterns, or otherwise chemically or physically modify the dispensed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source, light valve(s), and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable minors, prisms, diffractive optical elements, or solid state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

Article processing unit 340 can include a walled chamber 348 and bed 344 (collectively defining a build chamber), and a material dispenser 342 for distributing material. The material dispenser 342 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, CO2, N2, O2, SF6, CH4, CO, N2O, C2H2, C2H4, C2H6, C3H6, C3H8, i-C4H10, C4H10, 1-C4H8, cic-2,C4H7, 1,3-C4H6, 1,2-C4H6, C5H12, n-C5H12, i-C5H12, n-C6H14, C2H3C1, C7H16, C8H18, C10H22, C11H24, C12H26, C13H28, C14H30, C15H32, C16H34, C6H6, C6H5-CH3, C8H10, C2H5OH, CH3OH, iC4H8. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufacture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the mass of the build platform are not needed. Typically, build chambers intended for metal powders with a volume more than ~0.1-0.2 cubic meters (i.e., greater than 100-200 liters or heavier than 500-1,000 kg) will most benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed may be collected in a hopper for reuse in later print jobs. The powder collecting process may be automated and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
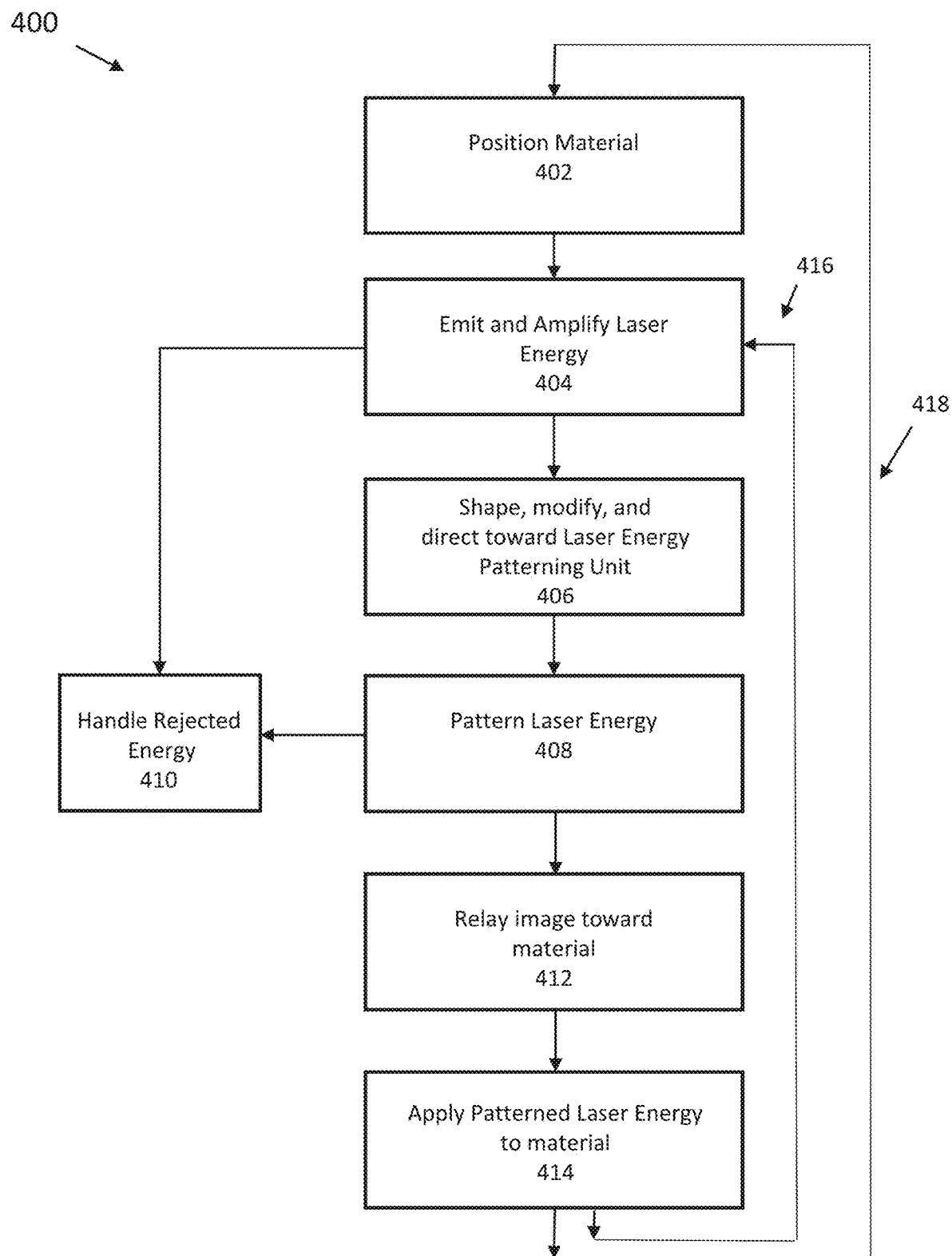
FIG. 4 illustrates another embodiment of a high fluence actively cooled light valve based additive manufacturing system.

One embodiment of operation of a manufacturing system suitable for additive or subtractive manufacture is illustrated in FIG. 4. In this embodiment, a flow chart 400 illustrates one embodiment of a manufacturing process supported by the described optical and mechanical components. In step 402, material is positioned in a bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned, with energy not forming a part of the pattern being handled in step 410 (this can include use of a beam dump as disclosed with respect to FIG. 2 and FIG. 3 that provide conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 416) until the image (or different and subsequent image) has been applied to all necessary regions of a top layer of the material. When application of energy to the top layer of the material is finished, a new layer can be applied (loop 418) to continue building the 3D structure. These process loops are continued until the 3D structure is complete, when remaining excess material can be removed or recycled.

Figure 5:
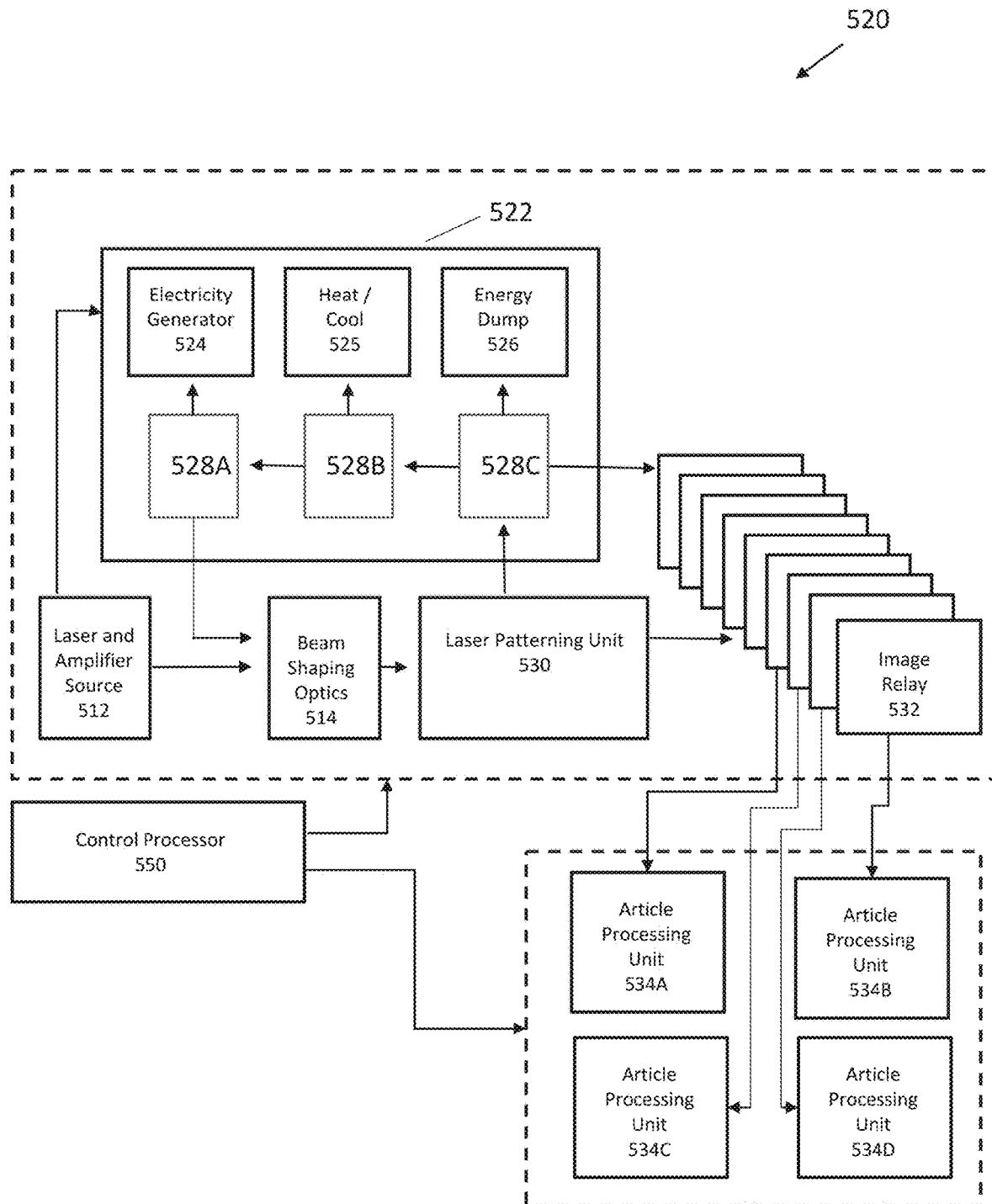
FIG. 5 illustrates another embodiment of a high fluence actively cooled light valve based additive manufacturing which incorporates a switchyard approach for recovery and further usage of waste energy.

FIG. 5 is one embodiment of an additive manufacturing system that includes a switchyard system enabling reuse of patterned two-dimensional energy. An additive manufacturing system 520 has an energy patterning system with a laser and amplifier source 512 that directs one or more continuous or intermittent laser beam(s) toward beam shaping optics 514. Excess heat can be transferred into a rejected energy handling unit 522 that can include an active light valve cooling system as disclosed with respect to FIGS. 1A-1D, FIG. 2, FIG. 3, and FIG. 4. After shaping, the beam is two-dimensionally patterned by an energy patterning unit 530, with generally some energy being directed to the rejected energy handling unit 522. Patterned energy is relayed by one of multiple image relays 532 toward one or more article processing units 534A, 534B, 534C, or 534D, typically as a two-dimensional image focused near a movable or fixed height bed. The bed be inside a cartridge that includes a powder hopper or similar material dispenser. Patterned laser beams, directed by the image relays 532, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 512 can be directed into one or more of an electricity generator 524, a heat/cool thermal management system 525, or an energy dump 526. Additionally, relays 528A, 528B, and 528C can respectively transfer energy to the electricity generator 524, the heat/cool thermal management system 525, or the energy dump 526. Optionally, relay 528C can direct patterned energy into the image relay 532 for further processing. In other embodiments, patterned energy can be directed by relay 528C, to relay 528B and 528A for insertion into the laser beam(s) provided by laser and amplifier source 512. Reuse of patterned images is also possible using image relay 532. Images can be redirected, inverted, mirrored, sub-patterned, or otherwise transformed for distribution to one or more article processing units 534A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An additive manufacturing method, comprising:
   directing a laser beam from a laser against a light valve for patterning the laser beam for printing an object in an additive manufacturing system;
   enclosing the light valve in a cooling housing comprising gaskets to seal interfaces with the light valve and with two or more fluid connectors to prevent fluid leakage from the cooling housing;
   pumping heat exchange fluid from a heat exchanger into the cooling housing through the fluid connectors, wherein the heat exchange fluid is sprayed over the light valve within the cooling housing using a nozzle configured to generate turbulence and phase change in the fluid for removing heat from the light valve; and
   circulating the sprayed heat exchange fluid from the cooling housing back to the heat exchanger to provide useful energy to at least one component of the additive manufacturing system.

2. The additive manufacturing method of claim 1, wherein the heat exchanger is connected to provide energy to at least one component of the additive manufacturing system.

3. The additive manufacturing method of claim 1, wherein the heat exchanger is configured to power a heat engine able to generate mechanical, thermoelectric, or electric power.

4. The additive manufacturing method of claim 1, wherein the heat exchanger is configured to be connected to selected components of the additive manufacturing system to increase temperature of the selected components.

5. The additive manufacturing method of claim 1, wherein the heat exchange fluid comprises a phase change material, wherein phase change of the heat exchange fluid removes at least part of the heat.

6. The additive manufacturing method of claim 1, wherein the heat exchange fluid is sprayed onto a hot substrate of the light valve.

7. The additive manufacturing method of claim 1, wherein an active light valve cooling system cools an array of light valves.

8. The additive manufacturing method of claim 1, wherein multiple laser beams from multiple lasers are directed to the light valve.

9. The additive manufacturing method of claim 1, wherein the light valve provides two-dimensionally patterned light from the laser for the printing.

10. The additive manufacturing method of claim 1, wherein a plurality of article processing units and build chambers are positioned to receive light from the light valve.

* * * * *